(12) United States Patent
Fujimoto et al.

(10) Patent No.: US 7,604,559 B2
(45) Date of Patent: Oct. 20, 2009

(54) ECCENTRICALLY OSCILLATING GEAR DEVICE

(75) Inventors: Kenichi Fujimoto, Mie (JP); Toshiharu Hibino, Mie (JP)

(73) Assignee: Nabtesco Corporation, Tokyo (JP)

( * ) Notice: Subject to any disclaimer, the term of this patent is extended or adjusted under 35 U.S.C. 154(b) by 399 days.

(21) Appl. No.: 10/597,121

(22) PCT Filed: Dec. 21, 2004

(86) PCT No.: PCT/JP2004/019121

§ 371 (c)(1),
(2), (4) Date: Jul. 12, 2006

(87) PCT Pub. No.: WO2005/073595

PCT Pub. Date: Aug. 11, 2005

(65) Prior Publication Data

US 2007/0167268 A1    Jul. 19, 2007

(30) Foreign Application Priority Data

Jan. 13, 2004  (JP) .......................... P2004-005237
Nov. 11, 2004  (JP) .......................... P2004-327633

(51) Int. Cl.
*F16H 1/32* (2006.01)
(52) U.S. Cl. ...................................... 475/170; 475/178
(58) Field of Classification Search ................. 475/170, 475/178, 179, 168
See application file for complete search history.

(56) References Cited

U.S. PATENT DOCUMENTS 6,492,787 B1 *  12/2002  Hibino et al. .......... 318/568.11
6,508,737 B2 *   1/2003  Fujimoto .................... 475/178

FOREIGN PATENT DOCUMENTS

| JP | 56-111348 | U | 8/1981 |
| JP | 02-245545 | A | 10/1990 |
| JP | 02-261943 | A | 10/1990 |
| JP | 05-180278 | A | 7/1993 |
| JP | 11-210843 | A | 8/1999 |

OTHER PUBLICATIONS

Claim translation of JP 11-210843.*

* cited by examiner

*Primary Examiner*—Tisha D Lewis
(74) *Attorney, Agent, or Firm*—Panitch Schwarze Belisario & Nadel LLP

(57) ABSTRACT

The eccentrically oscillating gear device is equipped with an internal gear (15) having internal gear pins (15a), a carrier (11) rotating relative to the internal gear, a pair of bearings (19, 20) that have a rolling element and a ring body for supporting the rolling element, a crank shaft supported by the carrier so as to be freely rotatable and external gears (13, 14) that are equipped with external teeth having a trochoid tooth profile whose tooth top portions are cut out, and disposed between the pair of bearings. The outer peripheries of the external gears are engaged with the internal gear pins and fitted to the crank portion of the crank shaft. The eccentrically oscillating gear device is designed so that the external gear makes an eccentrically oscillating motion by rotation of the crank shaft and the rotational output is taken out from the internal gear or the carrier.

4 Claims, 11 Drawing Sheets

Prior Art

Prior Art

Prior Art

ECCENTRICALLY OSCILLATING GEAR DEVICE

CROSS-REFERENCE TO RELATED APPLICATIONS

This application is a Section 371 of International Application No. PCT/JP2004/019121, filed Dec. 21, 2004, which was published in the Japanese language on Aug. 11, 2005, under International Publication No. WO 2005/073595 A1, the disclosure of which is incorporated herein by reference.

BACKGROUND OF THE INVENTION

The present invention relates to an eccentrically oscillating gear device in which an external gear is a trochoid tooth profile and an internal gear is a pinwheel.

An eccentrically oscillating gear device is used in a reducer for driving an arm member of a robot provided to a joint portion of an industrial robot, for example. The following Patent Document 1 discloses an eccentrically oscillating gear device in which an external gear comprises a peritrochoid tooth profile and an internal gear comprises a pinwheel. In this eccentrically oscillating gear device, as shown in FIGS. 4(a), (b), by cutting out the tip portions of the respective tooth tops 51a of the external gear 51, the tip portions are avoided from coming into contact with the inner-diameter portions of the main body of the internal gear member having circular grooves in which pins 52 are inserted, and the time for which the pins 52 located at a side of the internal gear 53 which does not contribute to the transmission of torque is forcedly rotated on its axis is reduced to thereby reduce the internal heat generation, so that breakdown caused by burn-in can be avoided.

When the tip portions of the tooth tops 51a of the external gear 51 as described above are cut out, as shown at the lower portion of FIG. 4(a) and FIG. 4(b), the pins 52 idle at the 180° counter position in the eccentric direction, and thus the pins 52 are easily inclined or easily drop off from pin grooves 52a. When such a situation occurs, the external gear 51 having the peritrochoid tooth profile bite at the pins 52, so that abnormal noise occurs or the pin grooves 52a are deformed. Furthermore, the output of a spur gearing may be locked.

In order to solve the above problem, as shown in FIGS. 5, 6, it is necessary that a pin press ring 55 is disposed between the external gears 51 and 51 to constrain the pins 52 (suppress inclination of the pins) (FIG. 5), or it is also necessary that a pin press ring 56 is disposed between the external gear 51 and a bearing 58 and another pin press ring 57 is disposed between the external gear and a bearing 59 (FIG. 6) (for example, see Japanese Patent Application Nos. JP-A-02-261943 and JP-A-05-180278).

However, when pin press members such as the pin press rings 55 to 57 shown in FIGS. 5 and 6 are used, the number of parts is increased, and also the device is designed to be large in the axial direction P, so that the degree of freedom of design is lost.

BRIEF SUMMARY OF THE INVENTION

In order to attain the above object, according to the present invention, an eccentrically oscillating gear device comprising an internal gear having internal gear pins on the inner periphery thereof, a carrier that is rotatable relatively to the internal gear, a pair of bearings that have a rolling element and a ring body for supporting the rolling element and disposed between the outer periphery of the carrier and the inner periphery of the internal gear, a crank shaft that is freely rotatably mounted on the carrier, and an external gear that is equipped with external teeth having a trochoid tooth profile on the outer periphery thereof, the tooth top portions of the external teeth being cut out, engaged with the internal gear pins on the outer periphery thereof, fitted to the crank portion of the crank shaft and disposed between the pair of bearings, the external gear making an eccentrically oscillating motion by rotation of the crank shaft so that a rotational output is taken out from the internal gear or the carrier, is characterized in that receiving portions for receiving the end portions of the internal gear pins are formed at the end surface portions of the external-gear side of the pair of bearings, and the internal gear pins are supported by the receiving portions, thereby regulating the movement of the internal gear pins to the carrier side.

According to the eccentrically oscillating gear device, the internal gear pins are received and supported by the receiving portions formed at the end face portions at the external-gear side of the pair of bearings. Therefore, when there is adopted the structure that the tooth top portions of the external gear is cut out, the internal gear pins under an idling state with respect to the external gear is regulated in the movement to the carrier side. Therefore, the pin press member used in the prior art can be omitted, and the degree of freedom in design can be enhanced. In addition, the device can be structurally shortened in the axial direction by the amount corresponding to the pin press member. Furthermore, the receiving portion brings the bearing with the pin press function. Therefore, it is unnecessary to use a dedicated part, so that the number of parts can be reduced and the cost merit can be achieved.

In the eccentrically oscillating gear device, the ring body of the pair of bearings is equipped with an outer race and an inner race, and the receiving portions are formed on the outer race or the inner race.

According to the eccentrically oscillating gear device of the present invention, when the structure that the tooth top portions of the external gear are cut out is adopted, the pin press member used in the prior art can be omitted, so that the number of parts can be reduced and the degree of freedom of design can be enhanced.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF THE INVENTION

Figure 1:
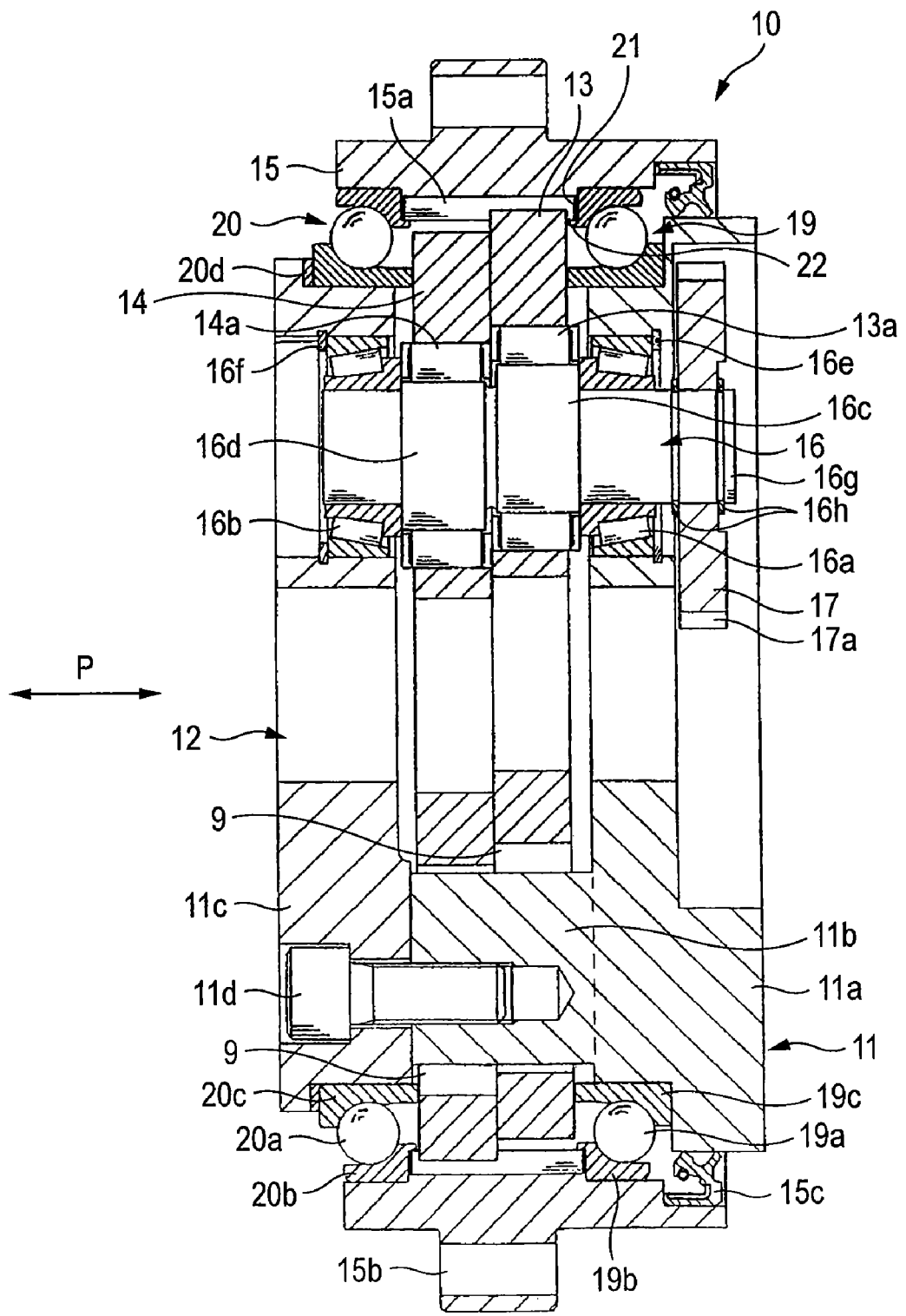
FIG. 1 is a side cross-sectional view showing an eccentrically oscillating gear device according to an embodiment.
Figure 2:
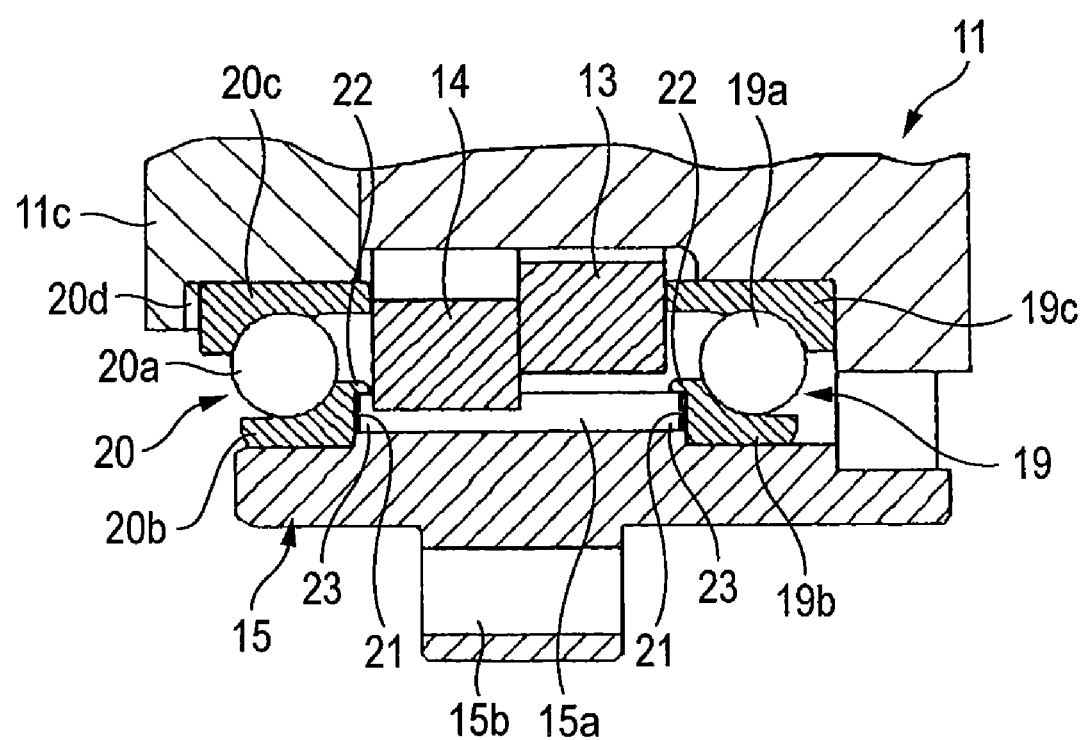
FIG. 2 is a side cross-sectional view showing the main part of FIG. 1.
Figure 3:
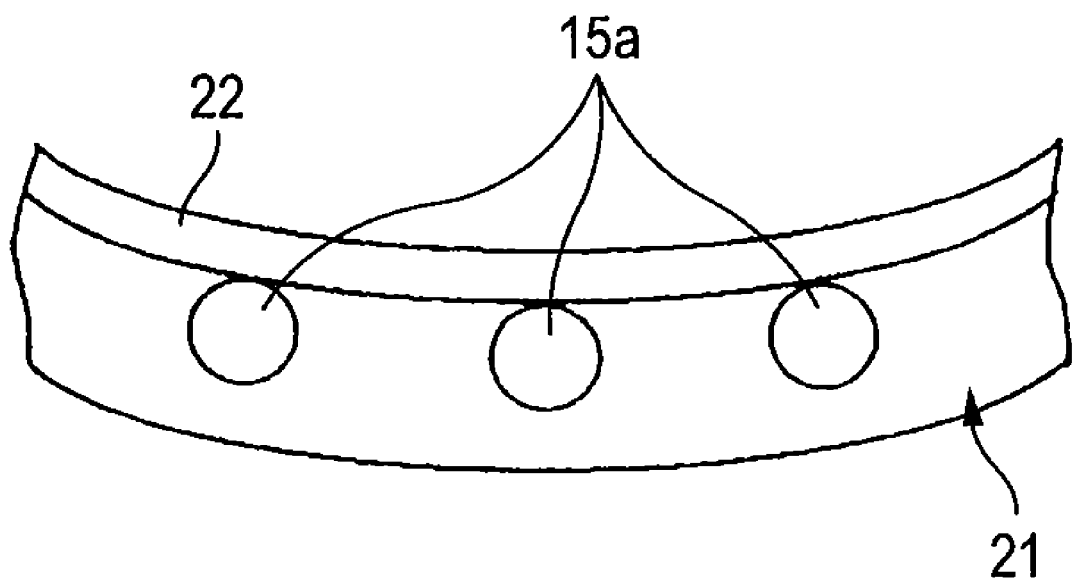
FIG. 3 is a partial front view showing the relative positional relationship between receiving portions provided to the side surface of the outer race of the main bearing of FIG. 2 and pins.

A preferred embodiment for implementing the present invention will be described with reference to the drawings. FIG. 1 is a side cross-sectional view showing an eccentrically oscillating gear device according to an embodiment of the present invention. FIG. 2 is a side cross-sectional view of the main part of FIG. 1. FIG. 3 is a partial front view showing the relative positional relationship between a receiving portion provided to the outer race side surface of a main bearing of FIG. 2 and pins.

Figure 4:
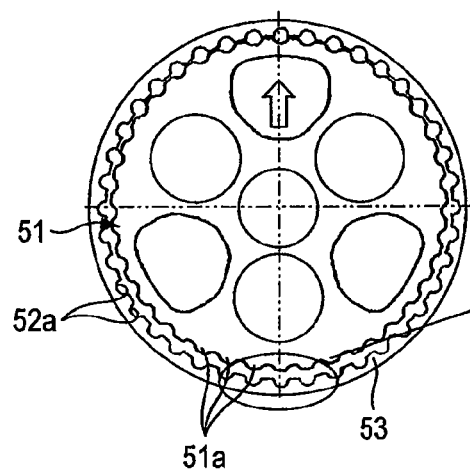
FIG. 4(a) is a side view showing a conventional eccentrically oscillating gear device.
FIG. 4(b) is a partially enlarged view of the conventional eccentrically oscillating gear device.
Figure 4:
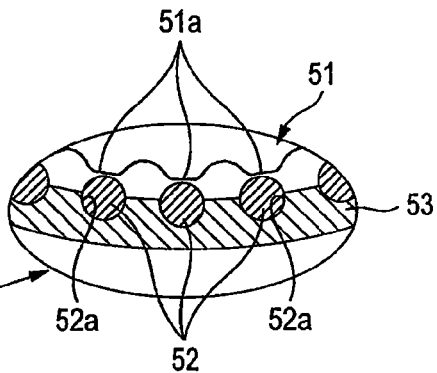

The eccentrically oscillating gear device 10 shown in FIG. 1 is equipped with an internal gear 15 having plural pin grooves formed in the inner peripheral portion (see FIG. 4) and plural pins (internal teeth) 15a disposed in the respective grooves, a carrier 11 which is relatively rotatable to the internal gear 15, a pair of main bearings 19, 20 comprising radial ball bearings disposed between the outer periphery of the carrier 11 and the inner periphery of the internal gear 15, plural crank shafts 16 which are freely rotatably supported by the carrier 11, and external gears 13, 14 each of which has, on the outer periphery thereof, external teeth having a trochoid type peritrochoid tooth shape whose tooth tops are cut out (see FIG. 4), the external gears 13, 14 being engaged with the respective pins 15a on the outer periphery thereof, fitted to the crank portions 16c, 16d of the crank shaft 16 and disposed between a pair of main bearings 19, 20.

The external gears 13, 14 are supported by the crank portions 16c, 16d of the plural crank shafts 16 so as to be moved eccentrically to the center axial line of the internal gear 15 through roller bearings 13a, 14a and make an orbital motion.

The carrier 11 is equipped with a block 11a, plural pillar portions 11b located in plural circular holes 9 in the outer gears 13, 14, and an end circular plate 11c to the plural pillar portions 11b by plural bolts 11d.

The carrier 11 is freely rotatably joined to the internal gear 15 through the main bearings 19, 20, and both the end portions of the crank shaft 16 are freely rotatably supported through conical rolling bearings 16a, 16b by the block 11a and the end circular plate 11c. The conical rolling bearing 16a is fixed to the block 11a by a retaining ring 16e, and the conical rolling bearing 16b is fixed to the end circular plate 11c by a retaining ring 16f.

An input gear 17 is fixed to the axial end portion 16g of one of the plural crank shafts 16 by a retaining ring 16h. There is disposed an input shaft (not shown) having a gear engaged with the external teeth 17a of the input gear 17 through a hollow hole 12 formed so as to penetrate through the substantially centers of the carrier 11 and the external gears 13, 14.

The rotational force is transmitted from an external motor or the like through the input gear 17 or the like to the crank shafts 16 and the crank shafts 16 are rotated, and thus the rotational force from the external motor or the like is transmitted to the external gears 13, 14 through the input shaft (see FIG. 9) engaged with the external teeth 17a of the input gear 17. Accordingly, the external gears 13, 14 are engaged with the pins 15a of the internal gear 15 whose tooth number is larger than that of the external gears 13, 14 by one, for example while the external gears 13, 14 make an orbital motion. By the rotation of the crank shafts 16, the external gears 13, 14 makes an eccentrically oscillating motion in conformity with the difference in the number of teeth (1) per one revolution while rotating on its axis, whereby the eccentrically oscillating gear device 10 of FIG. 1 operates as a reducer that can taken out a deceleration rotational output in connection with its rotation from the internal gear 15 or the carrier 11 as an outer case.

The main bearing 19 has a spherical rolling element 19a, and a ring body comprising an outer race 19b and an inner race 19c for supporting the rolling member 19a. Likewise, the main bearing 20 has a spherical rolling element 20a, and a ring body comprising an outer race 20b and an inner race 20c for supporting the rolling element 20a.

The main bearing 20 is located at the step portion of the end circular plate 11c so that the inner race 20c thereof is brought into contact with the side surface of the external gear 14 and pressed by a push 20d, and the main bearing 19 is located at the step portion of the block 11a so that the inner race 19c thereof is brought into contact with the side surface of the external gear 13.

Furthermore, an oil seal 15c is disposed between the internal gear 15 and the block 11a in the neighborhood of the main bearing 19. The internal gear 15 constitutes an outer case, and it is secured to an arm or the like of a robot through a hole 15b by a bolt, for example.

Next, the construction of constraining the pins 15a by providing a receiving portion to each end face of the main bearing 19, 20 will be described with reference to FIGS. 2, 3.

As shown in FIG. 2, the outer races 19b and 20b of the main bearings 19, 20 are provided with projection portions 22 which slightly project substantially in parallel to the pins 15a so as to hold the pins 15a in the pin grooves (see FIG. 4) on the respective end faces at the external gear 13, 14 side, and as shown in FIG. 3, the receiving portion 21 is formed in the form of a groove by the projection portion 22. Each pin 15a is located and held in the receiving portions 21 at both the ends 23 thereof.

When there is adopted the structure that the tooth top portions of the external gears 13, 14 are cut out, both the ends 23 of each pin 15a are received and supported by each receiving portion 21 of FIGS. 2, 3. Therefore, even when the pins 15a are idling with respect to the external gears 13, 14, the movement of the pins 15a to the carrier 11 side can be regulated.

Figure 5:
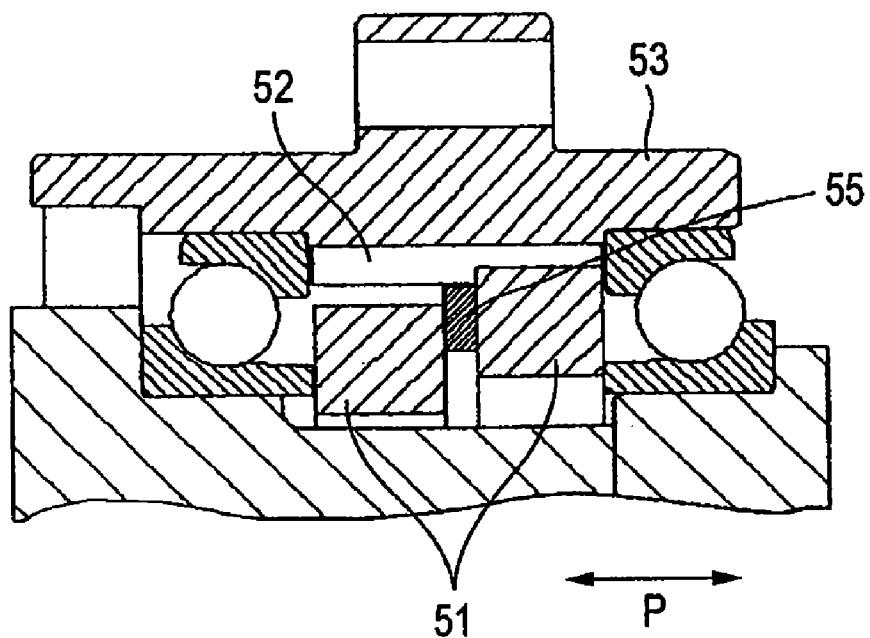
FIG. 5 is a side cross-sectional view showing the main part of the conventional construction to solve the problem in FIG. 4.
Figure 6:
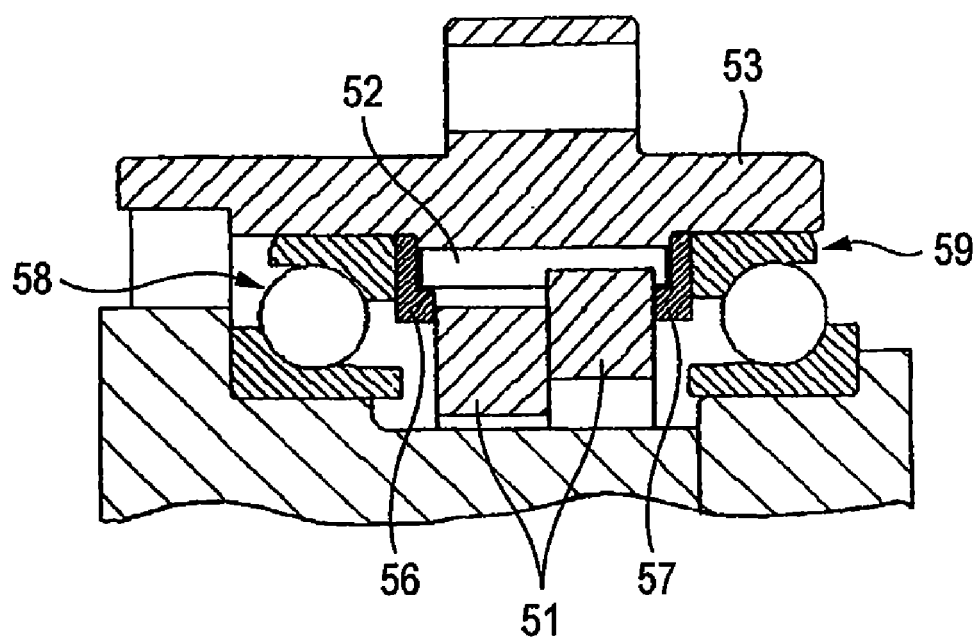
FIG. 6 is a side cross-sectional view showing the main part of another conventional construction to solve the problem in FIG. 4.

Accordingly, according to the eccentrically oscillating gear device 10 of this embodiment, the pin press members 55 to 57 which are required in the prior art as shown in FIGS. 5 and 6 are not required, so that the degree of freedom in design of the device can be enhanced, and the device can be constructed to be short in the axial direction P. Since the pin press function is added to the main bearings 19, 20, dedicated parts are not required to be used, and the number of parts can be reduced, so that a cost merit can be achieved.

Figure 9:
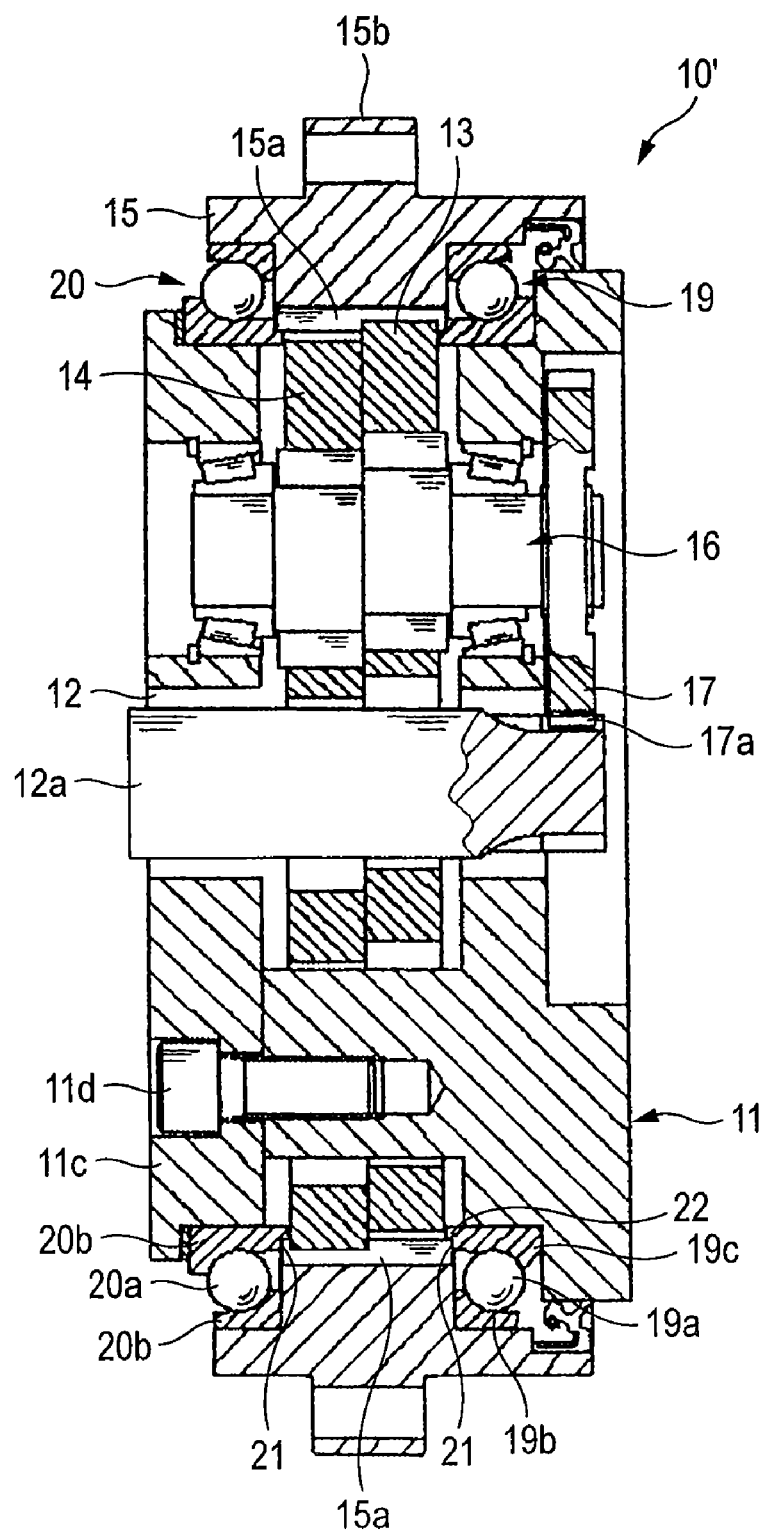
FIG. 9 is a side cross-sectional view showing the eccentrically oscillating gear device according to another embodiment.
Figure 10:
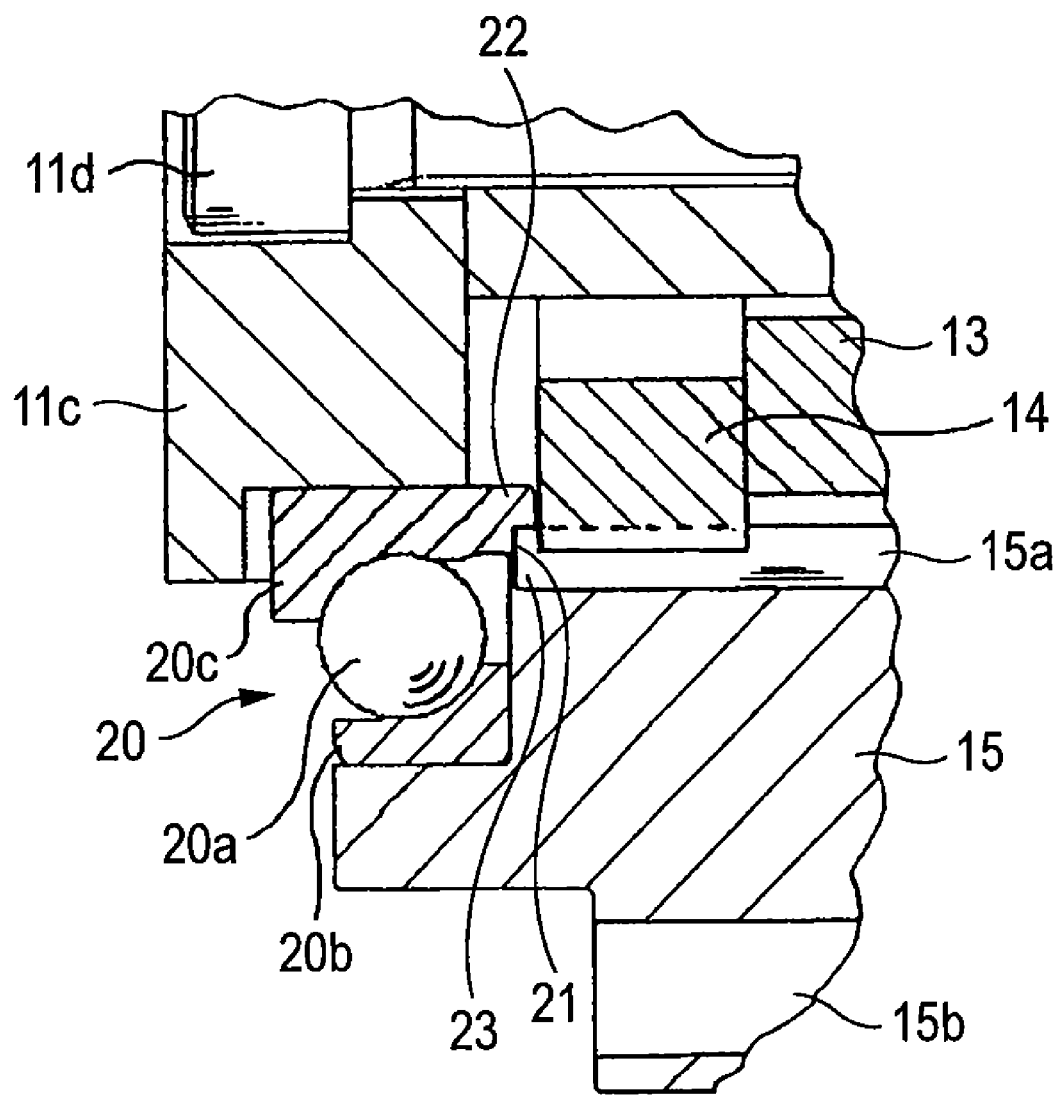
FIG. 10 is a side cross-sectional view showing the main part of FIG. 9.

Next, the eccentrically oscillating gear device according to another embodiment of the present invention will be described with reference to FIGS. 9 and 10. FIG. 9 is a side cross-sectional view showing the eccentrically oscillating gear device according to another embodiment. FIG. 10 is a side cross-sectional view of the main part of FIG. 9.

An eccentrically oscillating gear device 10' of FIG. 9 has the same basic construction as that of FIG. 1, however, it is different in that the receiving portion for constraining the pins is formed to the inner race of the main bearing. The same elements are represented by the same reference numerals, and the description thereof is omitted.

As shown in FIG. 9, the inner peripheral portion of the internal gear 15 projects more inwardly to the center side of the device 10' as compared with that of FIG. 1. The plural pins 15a located in the plural pin grooves are located over the outer races 19b, 20b of the main bearings 19, 20 and in the neighborhood of the inner races 19c, 20c. Therefore, as shown in FIGS. 9 and 10, the inner races 19c, 20c are provided with projection portions 22 which slightly project substantially in parallel to the pins 15a so as to hold the pins 15a in the pin grooves (FIG. 4) on the respective end faces at the external gear 13, 14 side, and the projection portions 22 form groove-shaped receiving portions 21. Each pin 15a is located and supported in the receiving portion 21 at both the ends 23 thereof.

As described above, in FIGS. 9 and 10, when there is adopted the structure that the tooth top portions of the external gears 13, 14 are cut out, both the ends 23 of each pin 15a are received and supported by the receiving portion 21, and thus even when the pins 15a are idling with respect to the external gears 13, 14 as shown in FIGS. 4(a), (b), the movement of the pins 15a to the carrier 11 side can be regulated.

Furthermore, in FIGS. 9 and 10, the movement in the axial direction of the external gears 13, 14 is regulated by the end faces of the projection portions 22 of the inner races 19c, 20c of the main bearings 19, 20.

The input shaft 12a is disposed in the hollow hole 12, the teeth of the gear of the input shaft 12a are engaged with the external teeth 17a of the input gear 17, and the input gear 17 is rotated by the rotation of the input shaft 12a.

According to the eccentrically oscillating gear device 10' of FIGS. 9 and 10, as in the case of FIGS. 1 and 2, the pin pressing members 55 to 57 shown in FIGS. 5 and 6 required in the prior art are not necessary, so that the degree of freedom in design of the device can be enhanced, and the device can be designed to be short in the axial direction P. The main bearings 19, 20 are provided with the pin press function, and thus it is unnecessary to use dedicated parts, so that the number of parts can be reduced and thus the cost merit can be achieved.

Figure 11:
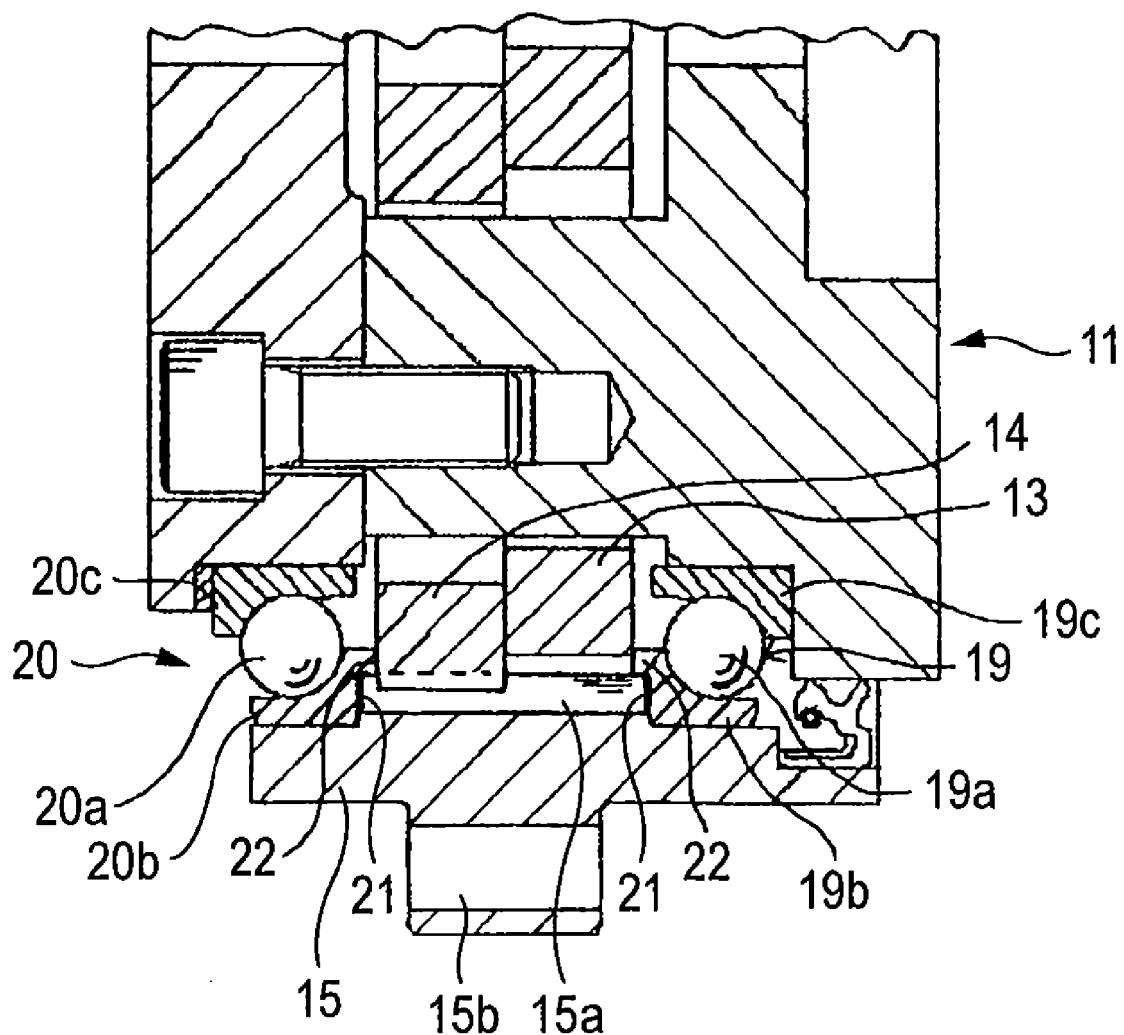
FIG. 11 is a side cross-sectional view showing the main part of another modification of FIGS. 1, 2.

The preferred embodiment for carrying out the invention has been described. However, the present invention is not limited to this embodiment, and various modifications may be made within the scope of the technical concept of the present invention. For example, in FIGS. 1 and 2, the movement in the axial direction of the external gears 13, 14 is regulated by the inner races 19c, 20c of the main bearings 19, 20. However, the movement in the axial direction of the external gears 13, 14 may be regulated by the end faces of the projection portions 22 of the outer races. For example, as shown in FIG. 11, the receiving portions 21 for receiving the pins 15a are constructed by the projection portions 222 of the outer races 19b, 20b of the main bearings 19, 20, and also the movement in the axial direction of the external gears 13, 14 on the side surfaces of the external gears 13, 14 is regulated by the end faces of the projection portions 22. In FIG. 11, the inner races 19c, 20 are far away from the side surfaces of the external gears 13, 14, and they do not contribute to the regulation of the movement in the axial direction of the external gears 13, 14.

Figure 7:
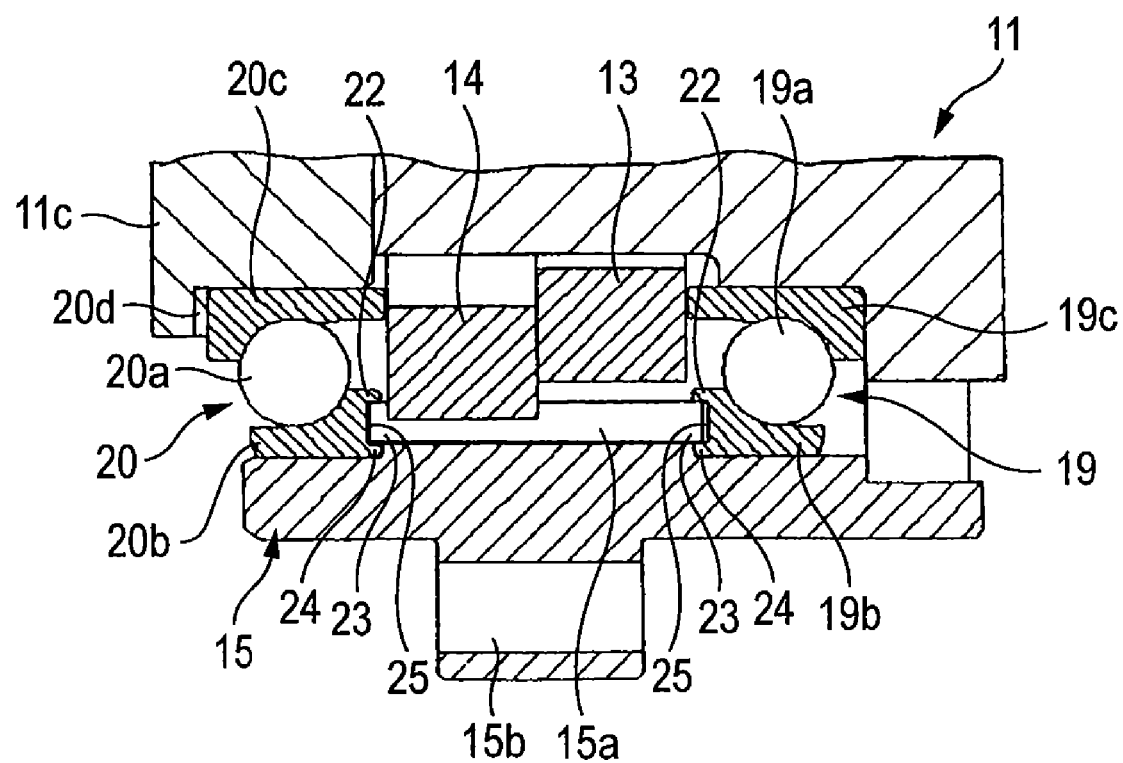
FIG. 7 is a side cross-sectional view showing the main part of a modification of FIG. 2.
Figure 8:
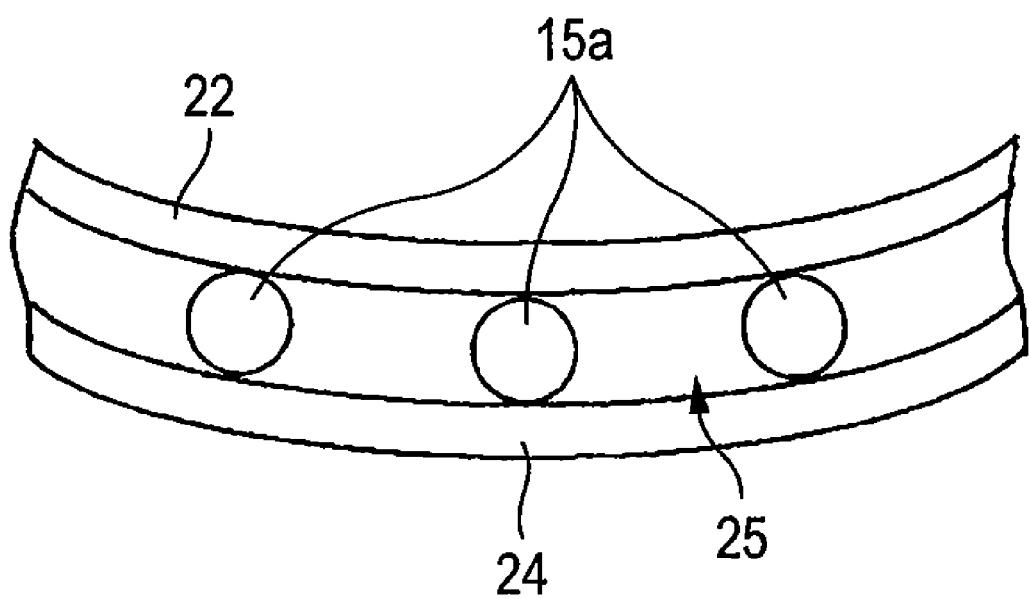
FIG. 8 is a partial front view showing the relative positional relationship between the receiving portions provided to the side surface of the outer race of the main bearing of FIG. 7 and the pins.

The receiving portions provided to the respective end faces of the main bearings 19, 20 may be constructed as shown in FIG. 8. That is, a pair of projection portions 22, 24 which slightly project substantially in parallel to the pins 15a so as to hold the pins 15a in the pin grooves (FIG. 4) are provided on the respective end faces of the outer races 19b, 20b of the main bearings 19, 20 as shown in FIG. 7, and the receiving portion 25 is formed in the form of a groove between the projecting portions 22 and 24 as shown in FIG. 8. Both the ends 23 of each pin 15a is located and supported in the receiving portion 25. Since both the ends 23 of each pin 15a are received and supported by the receiving portion 25, so that even when the pins 15 are idling with respect to the external gears 13, 14, the movement of the pins 15a to the carrier 11 side can be regulated and the same effect as shown in FIGS. 2, 3 can be achieved.

Furthermore, in FIGS. 2 and 7, the receiving portions 21, 25 are formed on the end faces of the outer races 19b, 20b of the main bearings 19, 20, however, the receiving portions may be likewise formed on the inner races 19c, 20c (see FIGS. 9 and 10).

The present invention relates to the eccentrically oscillating gear device in which the external gear has a trochoid tooth profile and the internal gear comprises a pin gear. Particularly, the present invention is suitable for a gear device used for an industrial robot, a machine tool, a hoisting machine for en elevator, transfer equipment, a heavy load lid opening/closing apparatus, etc.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. An eccentrically oscillating gear device comprising:
an internal gear having internal gear pins on an inner periphery thereof;
a carrier rotatable relatively to the internal gear;
a pair of bearings having a rolling element and a ring body for supporting the rolling element and disposed between an outer periphery of the carrier and the inner periphery of the internal gear;
a crank shaft freely rotatably mounted on the carrier; and
an external gear equipped with external teeth having a trochoid tooth profile on an outer periphery thereof in which tooth top portions of the external teeth are cut out, engaged with the internal gear pins on the outer periphery thereof, fitted to a crank portion of the crank shaft and disposed between the pair of bearings, wherein the external gear makes an eccentrically oscillating motion by rotation of the crank shaft so that a rotational output is taken out from the internal gear or the carrier, characterized in that receiving portions for receiving end portions of the internal gear pins are formed at end surface portions of an external-gear side of the pair of bearings, and the internal gear pins are supported by the receiving portions, thereby regulating movement of the internal gear pins to a carrier side.

2. The eccentrically oscillating gear device according to claim 1, wherein a ring body of the pair of bearings is equipped with an outer race and an inner race, and the receiving portions are formed on the outer race or the inner race.

3. The eccentrically oscillating gear device according to claim 1, wherein a pair of projection portions are formed on at least one of the end surface portions of the external-gear side of the pair of bearings, one of the receiving portions for receiving the end portions of the internal gear pins is formed as a groove between said pair of projection portions.

4. An eccentrically oscillating gear device comprising:
   an internal gear having internal gear pins on an inner periphery thereof;
   a carrier rotatable relative to the internal gear;
   a pair of bearings, each having a rolling element and a ring body having an outer race and an inner race for supporting the rolling element and disposed between an outer periphery of the carrier and the inner periphery of the internal gear;
   a crank shaft freely rotatably mounted on the carrier; and
   an external gear equipped with external teeth, engaged with the internal gear pins on the outer periphery thereof, fitted to a crank portion of the crank shaft and disposed between the pair of bearings, wherein the external gear makes an eccentrically oscillating motion by rotation of the crank shaft so that a rotational output is taken out from one of the internal gear and the carrier, wherein an end face of the outer race in one of said pair of bearings is adjacent to an end of the internal gear pins, and said end face of the outer race regulates movement in an axial direction of the external gear.

* * * * *

UNITED STATES PATENT AND TRADEMARK OFFICE
CERTIFICATE OF CORRECTION

| | | |
|---|---|---|
| PATENT NO. | : 7,604,559 B2 | Page 1 of 1 |
| APPLICATION NO. | : 10/597121 | |
| DATED | : October 20, 2009 | |
| INVENTOR(S) | : Fujimoto et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 498 days.

Signed and Sealed this

Fifth Day of October, 2010

David J. Kappos
*Director of the United States Patent and Trademark Office*